US005802911A

United States Patent [19]

Cahill et al.

[11] Patent Number: 5,802,911

[45] Date of Patent: Sep. 8, 1998

[54] SEMICONDUCTOR LAYER PRESSURE SWITCH

[75] Inventors: Sean Samuel Cahill, Palo Alto, Calif.; Tokudai Neda, Tokyo, Japan

[73] Assignee: Tokyo Gas Co., Ltd., Tokyo, Japan

[21] Appl. No.: 305,443

[22] Filed: Sep. 13, 1994

[51] Int. Cl.[6] .............................. G01L 9/06; H01H 35/40

[52] U.S. Cl. ............................................ 73/727; 200/83 R

[58] Field of Search ............................... 200/83 N, 83 R; 73/715, 716, 717, 718, 719, 720, 721, 722, 723, 724, 725, 726, 727

[56] References Cited

U.S. PATENT DOCUMENTS

| | | | |
|---|---|---|---|
| 4,543,457 | 9/1985 | Petersen et al. | 200/83 N |
| 4,965,415 | 10/1990 | Young et al. | 200/83 N |
| 5,177,579 | 1/1993 | Jerman | 73/724 |
| 5,367,878 | 11/1994 | Muntz et al. | 200/83 N |

OTHER PUBLICATIONS

IEEE Transactions On Electron Devices, vol. Ed–26(12), pp. 1887–1896, Dec. (1979).

IEEE Transactions On Electron Devices, vol. 35(8), pp. 1289–1297, Aug. (1988).

*Primary Examiner*—William L. Oen

*Attorney, Agent, or Firm*—Armstrong, Westerman, Hattori, McLeland & Naughton

[57] ABSTRACT

A pressure switch element (1) including a semiconductor layer (3) having a diaphragm portion (5) in its center and a plate (2) having a through hole communicating with the exterior, which are stacked one on another so as to define a gas space (6) between the diaphragm portion of the semiconductor layer and the plate. The element (1) further includes an insulating layer (4) provided on the lower surface of the diaphragm portion (5), a first switch electrode (9) provided on the lower surface of the insulating layer (4), and a second switch electrode (10) behaving as a fixed electrode provided on the plate (2), such that chattering is prevented with a simple structure without using a complex electronic circuit.

5 Claims, 3 Drawing Sheets

FIG.1(A)
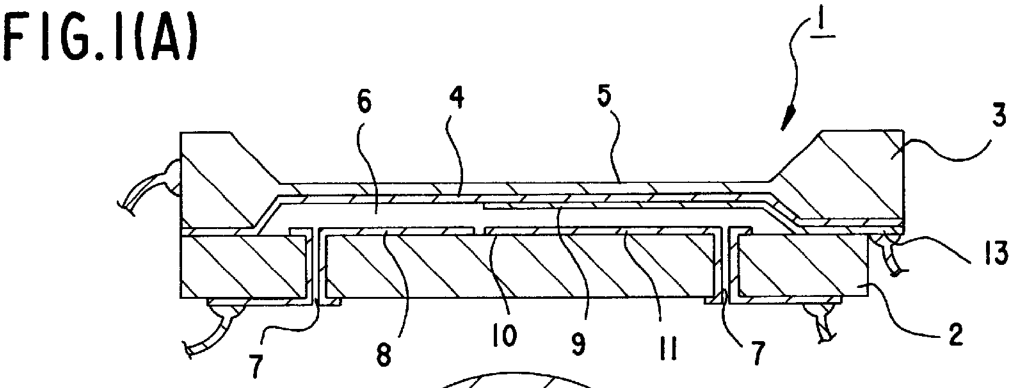
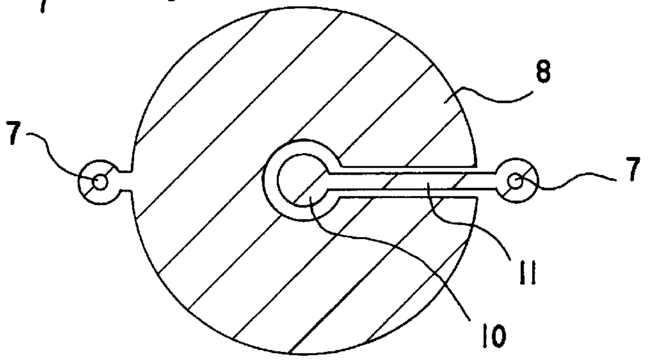
FIG.1(B)
FIG.1(C)
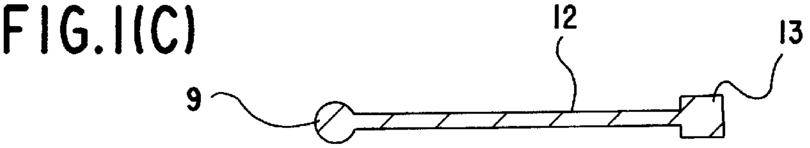
FIG.2
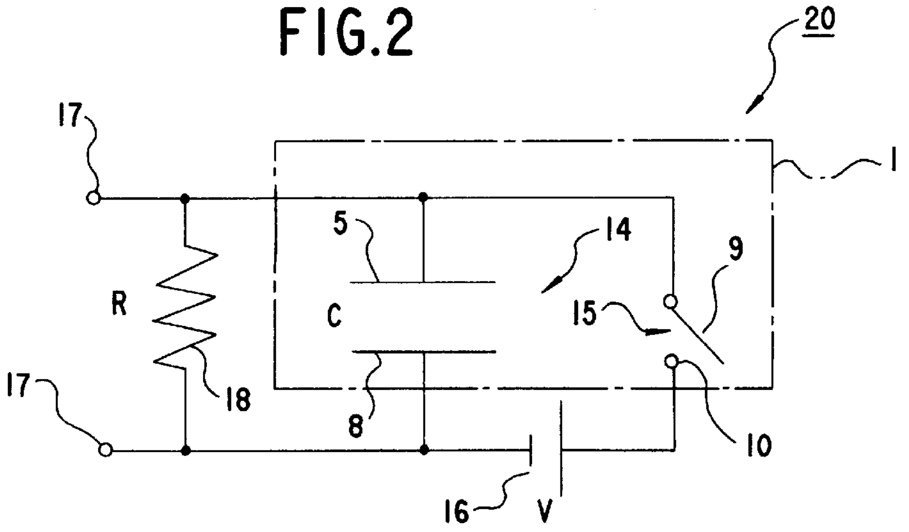

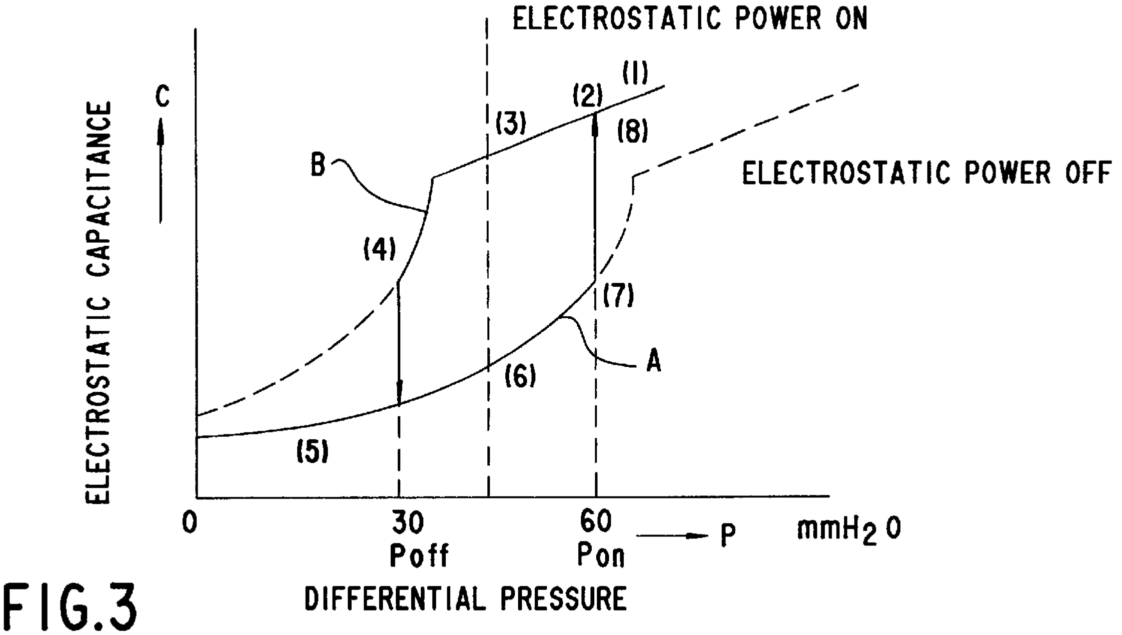
FIG.3
FIG.4(A)
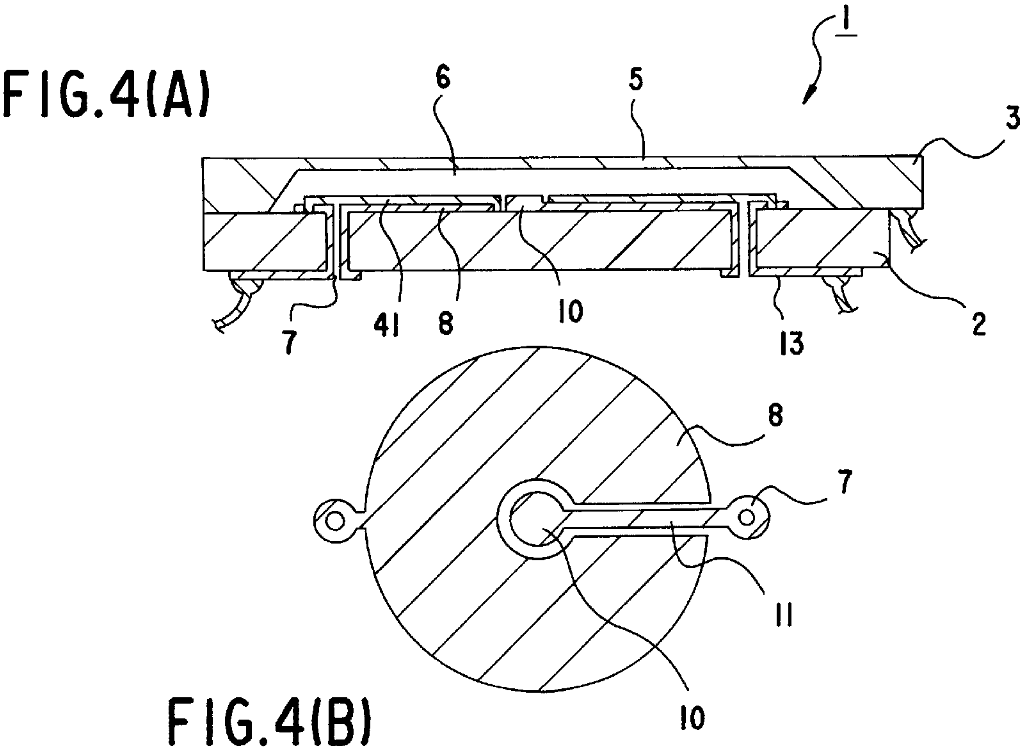
FIG.4(B)

SEMICONDUCTOR LAYER PRESSURE SWITCH

BACKGROUND OF THE INVENTION

1. Field of the Invention

This invention relates to a pressure switch element and a pressure switch using the pressure switch element for detecting leakage of fluid such as gas by detecting changes in pressure of such fluid, a pressure switch using such a pressure switch element, and more particularly, to a pressure switch element and a pressure switch using the pressure switch element of a semiconductor diaphragm type made by fine-working a semiconductor.

2. Description of the Prior Art

A diaphragm type pressure switch using a semiconductor for use in detection of state of use of a terminal valve of a gas pipe network is schematically shown in FIG. 5. A conventional diaphragm type semiconductor pressure switch, such as one disclosed by Japanese Patent Laid-Open Hei 1-217821, is composed of an insulating plate 31 made of, for example, glass, a fixed electrode 32 provided on the plate 31, a diaphragm portion 33 made of silicon and opposed at a distance to the fixed electrode 32, a projection 34 projecting downward from the lower surface of the diaphragm portion 34, and a conductive film 35 provided on the lower surface of the projection 34.

In the diaphragm type pressure switch of FIG. 5, when the pressure in the interior space becomes lower than that in the exterior space, the diaphragm 33 deflects inward due to the differential pressure, which results in decreasing the distance between the fixed electrode 32 and the conductive film 35.

When the differential pressure further increases, the diaphragm 33 further deflects inward due to the differential pressure, and the conductive film 35 touches the fixed electrode 32, resulting in detection of pressure by short-circuiting the pair of electrodes.

In such diaphragm type semiconductor pressure switches, the position for changing from ON state to Off state and the position for changing from OFF state to ON state are a common point. As a result, so-called chattering occurs in which instable ON and OFF actions are repeated, attending to small changes in pressure around the switching point.

Such chattering occurring near the ON-OFF switching threshold of the pressure switch causes errors in operation and damage to associated circuits and equipment.

Japanese Patent Laid-Open Sho 61-101931 proposed a pressure switch having a function of preventing the chattering. This is a mechanical pressure switch implementing hysteresis characteristics to ON/OFF actions by a mechanical arrangement.

Since it is difficult to use the conventional chattering preventing mechanism in a semiconductor pressure switch having a microscopic operational mechanism, an electronic circuit is used to prevent the chattering of a semiconductor pressure switch. The electronic circuit, however, is very complicated.

OBJECT OF THE INVENTION

It is therefore an object of the invention to provide a diaphragm type semiconductor pressure switch element and a pressure switch using the element, having a function of preventing chattering with a simple structure not using a complex electronic circuit.

SUMMARY OF THE INVENTION

According to the invention, chattering-caused changes in gas pressure near an operation point are prevented by implementing a hysteresis characteristic in motions of the diaphragm portion by selectively applying a voltage to the electrostatically attractive pair composed of the diaphragm portion and the fixed electrode.

That is, the invention provides a pressure switch element including a semiconductor layer having a diaphragm portion in the center thereof and a plate having a through hole communicating with the exterior, which are stacked on one another so as to define a gas space between the diaphragm portion of the semiconductor layer and the plate, comprising an insulating layer provided on a lower surface of the diaphragm portion; a first switch electrode provided on the insulating layer; and a fixed electrode and a second switch electrode provided on the plate.

The diaphragm portion and the fixed electrode form an electrostatically attractive pair while the first switch electrode and the second switch electrode form a switch.

The diaphragm portion and the fixed electrode are connected to a power source via the switch composed of the first switch electrode and the second switch electrode.

A voltage is applied to the diaphragm portion behaving as a diaphragm electrode and the fixed electrode, which form the electrostatically attractive pair, by an operation of the contact switch, such that both electrodes maintain contact due to an electrostatically attractive force. When a change in gas pressure causes the diaphragm portion to increase its returning force, the contact switch becomes open. As a result, the voltage having been applied to the diaphragm electrode and the fixed electrode is removed, and the switch is restored, loosing the electrostatically attractive force. Because of these operations, a hysteresis characteristic is implemented in ON and OFF actions of the pressure switch element or the pressure switch using the element.

BRIEF DESCRIPTION OF THE DRAWING

FIGS. 1A, 1B and 1C are schematic diagrams of a semiconductor pressure switch element according to an embodiment of the invention;

FIG. 2 is a block diagram of a semiconductor pressure switch using the pressure switch element of FIGS. 1A through 1C;

FIG. 3 is a characteristic diagram showing operations of the semiconductor pressure switch according to the invention;

FIG. 4A and 4B are schematic diagrams of a semiconductor pressure switch according to another embodiment of the invention;

DETAILED DESCRIPTION OF THE PREFERRED EMBODIMENTS

Figure 5:
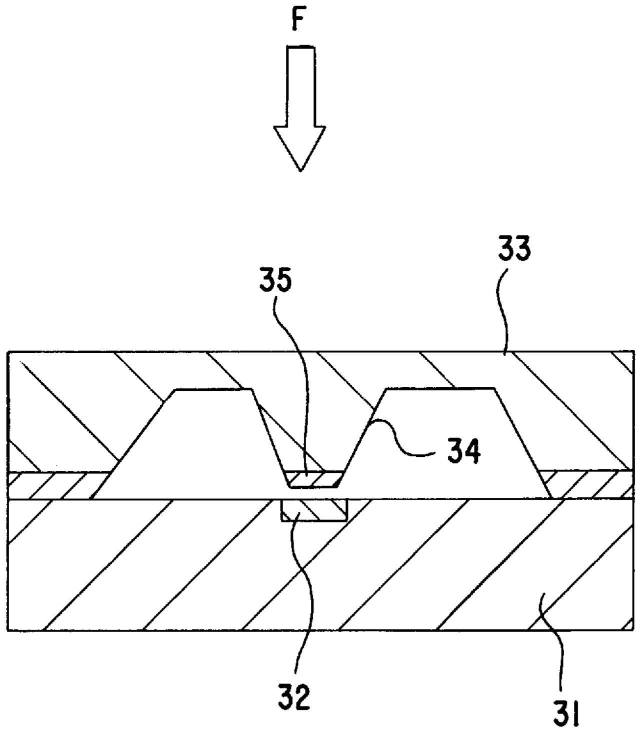
FIG. 5 is a schematic diagram showing an existing semiconductor pressure switch.

Arrangement of a pressure switch element designed to prevent chattering by using an electrostatic force according to the invention is explained below with reference to FIGS. 1A to 1C. FIG. 1A is a cross-section of the pressure switch element, FIG. 1B is a plan view of electrodes provided on a glass plate, and FIG. 1C is a plan view of a contact switch electrode attached to a silicon diaphragm.

The pressure switch element 1 having the chattering preventing function is composed of a glass plate 2 made of, for example, Pyrex (trademark) glass, and a silicon plate 3 stacked on the glass plate 2 via an insulating layer 4. The silicon plate 3 includes a diaphragm portion 5 formed by etching the central wide area of the silicon plate except for the outer marginal portion from the topside and the downside thereof. An insulating layer 4 is provided on the entire lower surface of the silicon plate 3 including the diaphragm portion 5. Provided in the center on the lower surface of the insulating layer 4 is a first contact switch electrode 9 having a substantially circular shape. A lead 12 extends from the first contact switch electrode 9 up to a portion where the electrode pad 13 is provided.

A gas space is defined between the diaphragm portion 5 of the silicon plate 3 and the upper surface of the glass plate 2. The glass plate 2 includes one or more pressure inlets 7 communicating the gas space 6 with the exterior of the element. Formed on the surface of the glass plate 2 facing to the gas space 6 are a fixed electrode 8, behaving as one of electrodes of an electrostatically attractive pair, and a second contact switch electrode 10 provided in a fixed position opposed to the contact switch electrode 9. The second contact switch electrode 10 is concentrically located in the center of the fixed electrode 8. A lead 11 extends from the second contact switch electrode 10, through a pass made by partly cutting off the fixed electrode 8 and through the pressure inlet 7, to the exterior of the gas space 6. Similarly, a lead extends from the fixed electrode 8 through another pressure inlet 7 to the exterior of the gas space 6 where an electrode pad 13 is provided.

The diaphragm portion 5, the insulating layer 4 and the fixed electrode 8 form an electrostatically attractive pair. The lead 12 from the first contact switch electrode 9 and the lead 11 from the second contact switch electrode 10 are opposed to each other.

Arrangement of a pressure switch using the pressure switch element is shown in FIG. 2. The pressure switch 20 having a chattering preventing function includes the pressure switch element 1 having the chattering preventing function, a d.c. power source 16 such as a lithium battery, and an output terminal 17. The electrostatically attractive pair 14 of the pressure switch element 1 composed of the diaphragm 5 and the fixed electrode 8 opposed to each other via the insulating layer 4, the switch 15 composed of the first contact switch electrode 9 and the second contact switch electrode 10, and the d.c. power source 16 is coupled in series to form a closed circuit. Terminals 17 are led out from both electrodes of the electrostatically attractive pair 14 and are coupled to means for detecting electrostatic capacitance of the electrostatically attractive pair 14. A result of the detection is processed in accordance with a predetermined logic to execute a switching action.

An external resistor 18 is connected in parallel with the electrostatically attractive pair 14. When the contact switch 15 is turned on, an electric charge accumulated in the electrostatically attractive pair 14, and a resultant electrostatically attractive force causes the diaphragm electrode 5 to adhere to the fixed electrode 8. When the contact switch 15 is turned off, the electric charge in the electrostatically attractive pair 14 is discharged to the exterior resistor 18, and the electrically attractive force rapidly decreases to permit the diaphragm to return to a position determined by the differential pressure between the upside and the downside of the diaphragm.

An operation of the pressure switch element is explained below. When the gas pressure in the interior gas space 6 (in the downside of the diaphragm 5) becomes smaller than the gas pressure of the exterior (on the topside of the diaphragm 5), the diaphragm 5 deflects inward. As the differential pressure becomes larger, the first contact switch electrode 9 attached to the diaphragm 5 touches the second contact switch electrode 10 attached to glass plate 2, and a voltage from the d.c. power source 16 is applied to the diaphragm electrode 5 and the fixed electrode 8 of the electrostatically attractive pair 14. As a result, an electrostatically attractive force is produced between the both electrodes 5 and 8 of the pair 14, the diaphragm 5 of the pair 14 adheres to the fixed electrode. The electrostatically attractive force maintains contact between the first electrode 9 and the second electrode 10 of the contact switch.

When the pressure in the interior gas space 6 increases, the deflection of the diaphragm 5 decreases. Nevertheless, as long as the restoring force of the diaphragm 5 is smaller than the sum of a force due to the differential pressure and the electrostatically attractive force of the electrostatically attractive pair 14, adhesion of the electrodes of the electrostatically attractive pair 14 and of the contact switch 15 is maintained. When the differential pressure further decreases due to a further increase in pressure in the interior gas space 6, the deflection of the diaphragm 5 decreases, and the restoring force of the diaphragm 5 comes to overcome the sum of the force due to the differential pressure and the electrostatically attractive force of the electrostatically attractive pair 14. Then, the first electrode 9 and the second electrode 10 of the contact switch 15 are detached, and the voltage having applied to the electrodes 5, 8 of the electrostatically attractive pair 14 is removed. Thus, the electrostatically attractive force disappears, and the switch is restored.

By choosing construction of the switch element and the value of applied voltage such that the differential pressure causing the first electrode 9 to touch the second electrode 10 is 60 mm $H_2O$ and that the differential pressure causing them to detach is 30 mm $H_2O$, the hysteresis curve shown in FIG. 3 is obtained.

FIG. 3 shows changes in electrostatic capacitance of the electrostatically attractive pair with differential pressure. In FIG. 3, a curve A shows a characteristics with no voltage applied to the electrostatically attractive pair 14, and a curve B shows a characteristics with a voltage applied to the pair 14. Portions on the left of turning points of the curves A and B indicate zones in which the electrodes 5 and 8 of the electrostatically attractive pair are isolated, while portions on the right of the turning points indicate zones after the electrodes 5 and 8 of the pair 14 get into contact.

In FIG. 3, P refers to differential pressure on the topside and the downside of the diaphragm 5 of the electrostatically attractive pair 14, V refers to voltage applied between the diaphragm 5 and the fixed electrode 8 of the pair 14, Pon refers to a value of differential pressure (operating pressure) at which the first electrode 9 and the second electrode of the contact switch get into contact due to an increase in differential pressure, and Poff refers to a value of differential pressure at which the restoring force of the diaphragm 5 overcomes the sum of the force due to the differential pressure and the electrostatically attractive force of the electrostatically attractive pair 14 and causes the first electrode to come apart from the second electrode 10 (restoring pressure).

In the range (1) where the differential pressure P is larger than the operating pressure Pon, namely, P>Pon, voltage V is applied to the diaphragm electrode 5 and the fixed electrode 8.

At the point (2) where the differential pressure P has decreased to the operating pressure Pon, namely, P=Pon, the restoring force of the diaphragm 5 does not yet overcome the sum of the force due to the differential pressure and the electrostatically attractive force, and the contact switch 15 is still maintained ON, resulting in the voltage V being continuously applied to the diaphragm electrode 5 and the fixed electrode 8.

In the region (3) where the differential pressure P has decreased to a value between the operation pressure Pon and the restoring pressure Poff, namely, Pon>P>Poff, the restoring force of the diaphragm 5 does not yet overcome the sum of the force due to the differential pressure and the electrostatically attractive force, and the first electrode 9 and the second electrode 10 of the contact switch 15 are still held in contact, resulting in the voltage V being continuously applied to the electrostatically attractive pair 14.

At the point (4) where the differential pressure P has decreased to the restoring pressure Poff, namely, P=Poff, the restoring force of the diaphragm 5 overcomes the sum of the force due to the differential pressure and the electrostatically attractive force, and the first electrode 9 and the second electrode 10 of the contact switch 15 can no longer maintain their contact. Therefore, electrostatically attractive force of the electrostatically attractive pair 14 rapidly decreases due to removal of the applied voltage, and the diaphragm 5 returns with its restoring force to a position on the curve A of a characteristic with no electrostatic power applied.

After that, in the (5) where the differential pressure P has further decreased below the restoring pressure Poff, namely, P<Poff, the diaphragm 5 moves on the curve A for the state with no voltage applied, proportionally to the differential pressure.

In the region (6) where the pressure P has increased to a value not less than the restoring pressure Poff and smaller than the operating pressure Pon, namely Poff≦P<Pon, the first electrode 9 and the second electrode of the contact switch 15 are distant, and no voltage is applied to the electrostatically attractive pair 14. Therefore, capacitance of the electrostatically attractive pair 14 increases along the curve A in response to an increase in differential pressure P.

At the point (7) where the differential pressure P has increased to be equal to the operating pressure Pon, the first electrode 9 and the second electrode 9 of the contact switch 15 get into contact, and the voltage V is applied to the electrodes 5 and 8 of the electrostatically attractive pair 14 to produce an electrostatically attractive force. Then, the electrostatic capacitance changes along the curve B of the characteristic with electrostatic force applied.

In the range (8) where the pressure difference P has further increased, the electrodes 5 and 8 of the electrostatically attractive pair 14 contact with greater and greater force, producing greater and greater electrostatic capacitance and hence maintaining the state with the voltage V applied to the electrostatically attractive pair 14.

Another embodiment of the pressure switch element according to the invention is explained below with reference to FIG. 4. The pressure switch element 1 according to the embodiment is different from the pressure switch according to the first embodiment shown in FIG. 1 in that a single common electrode behaves as both the diaphragm electrode 5 of the electrostatic attractive pair 14 and the first electrode 9 of the contact switch 15 and that an insulating layer 41 is provided on the fixed electrode 8 of the electrostatically attractive pair 14.

More specifically, the pressure switch element 1 according to the instant embodiment includes the glass plate 2 made of, for example, Pyrex (trademark) glass, and the silicon plate 3 provided on the glass plate 2. The silicon plate 3 includes the diaphragm portion 5 made by etching its central wide portion except for the outer marginal portion from the downside thereof.

The gas space 6 is defined between the diaphragm portion 5 of the silicon plate 3 and the upper surface of the glass plate 2. The glass plate 2 has one or more pressure inlets 7 communicating the gas space 6 to the exterior of the element, the fixed electrode 8 provided on one surface thereof facing to the gas space 6 to behave as one of electrodes of the electrostatically attractive pair 14, and the contact switch electrode 10 provided in a fixed position opposed to a central portion of the diaphragm portion 5. The contact switch electrode 10 is concentrically located in the center of the fixed electrode 8. The lead 11 extends from the second contact switch electrode 10, through a pass made by partly cutting off the fixed electrode 8 and through the pressure inlet 7, to the exterior of the gas space 6. Similarly, a lead extends from the fixed electrode 8 through another pressure inlet 7 to the exterior of the gas space 6 where an electrode pad 13 is provided.

Provided on the fixed electrode 8 is an insulating layer 41 made of an insulating material such as silicon dioxide ($SiO_2$) and silicon nitride ($Si_3N_4$). The thickness of the contact switch electrode 10 is larger than the sum of the thickness of the fixed electrode 8 and the thickness of the insulating layer 41 so as to project above the level of the insulating layer 41.

The diaphragm portion 5, the insulating layer 41 and the fixed electrode 8 form the electrostatically attractive pair 14.

With this arrangement, a hysteresis characteristic is implemented in the behavior of the pressure switch. The pressure switch element may also use a unitary electrode in lieu of and behaving as the fixed electrode 8 and the second electrode of the contact switch.

As described above, the present invention can implement a chattering preventing function to a semiconductor pressure switch by merely providing a simple additional arrangement to a pressure switch element without using a complex electronic circuit.

The process for fabricating the mechanism for this purpose is similar to one for fabricating semiconductor pressure switches, and semiconductor pressure switches with such chattering preventing function can be manufactured in volume production by simply adding some steps to a manufacturing process of conventional semiconductor pressure switches.

What is claimed is:

1. A pressure switch element including a semiconductor layer having a diaphragm portion in a center thereof and a plate having a through hole, said semiconductor layer and said plate being stacked one on another and forming a gas space between said diaphragm portion of said semiconductor layer and said plate with said through hole communicating between the interior of said gas space and the exterior of said pressure switch element, said pressure switch element comprising:

- an insulating layer on said diaphragm portion of said semiconductor layer and facing said plate;
- a first switch electrode on said insulating layer; and
- a fixed electrode and a second switch electrode on said plate;
- said diaphragm portion on said semiconductor layer, said insulating layer on said diaphragm portion of said semiconductor layer and said fixed electrode on said plate forming a first of a pair of electrostatically attracted contacts; and
- said fixed electrode and said second switch electrode on said plate forming a second of said pair of said electrostatically attracted contacts;

said through hole communicating between the interior of said gas space and the exterior of said pressure switch element increasing and decreasing the space between said electrostatically attracted contacts as gas pressure exterior of said pressure switch increase or decrease and is fed to or exhausted from said gas space in said pressure switch element.

2. The pressure switch element according to claim 1 wherein said diaphragm portion and said fixed electrode constitute an electrostatically attractive pair.

3. The pressure switch element according to claim 2 wherein said first switch electrode and said second switch electrode form a switch.

4. The pressure switch element according to claim 1 wherein said first switch electrode and said second switch electrode form a switch.

5. A pressure switch including a pressure switch element comprising:

a semiconductor layer having a diaphragm portion in the center thereof and a plate having a through hole passing through said plate, said semiconductor layer and said plate being stacked one on the other so that said diaphragm portion and said plate form a gas space between said diaphragm portion of said semiconductor layer and said plate and said through hole on said plate communicates said gas chamber with gas pressure exterior to said space;

an insulating layer on a surface of said diaphragm portion facing said plate;

a first switch electrode on said insulating layer; and a fixed electrode and a second switch on said plate, said diaphragm portion and said fixed electrode being connected to a power source via a switch composed of said first switch electrode and said second switch electrode, said through hole communicating between the interior of said gas space and the exterior of said pressure switch element increasing and decreasing the space between said switch electrodes as gas pressure exterior of said presssure switch increase or decrease and is fed to or exhausted from said gas space in said pressure switch element.

* * * * *